(12) United States Patent
Chuang

(10) Patent No.: US 7,350,938 B2
(45) Date of Patent: Apr. 1, 2008

(54) TELESCOPIC AND ILLUMINATIVE DEVICE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 338 days.

(21) Appl. No.: 10/907,727

(22) Filed: Apr. 13, 2005

(65) Prior Publication Data

US 2006/0232971 A1   Oct. 19, 2006

(51) Int. Cl.
*F21V 33/00* (2006.01)
(52) U.S. Cl. ..................... 362/253; 362/240
(58) Field of Classification Search ............. 362/184, 362/187, 188, 194, 200, 202, 208, 227, 240, 362/245, 254
See application file for complete search history.

(56) References Cited

U.S. PATENT DOCUMENTS

| | | | | |
|---|---|---|---|---|
| 1,740,314 A | * | 12/1929 | Pitney | ............. 362/202 |
| 4,580,198 A | * | 4/1986 | Zinnanti, Jr. | ............. 362/203 |
| 6,004,264 A | * | 12/1999 | Sano et al. | ............. 600/178 |
| 6,811,268 B2 | * | 11/2004 | Watson | ............. 359/611 |

\* cited by examiner

*Primary Examiner*—Tho D. Ta
*Assistant Examiner*—Travis Chambers
(74) *Attorney, Agent, or Firm*—Alan Kamrath; Kamrath & Associates PA

(57) ABSTRACT

A telescopic and illuminative device includes a telescope and a flashlight pivotally connected with the telescope. The flashlight can be switched between a concealed position and an exposed position. In the concealed position, the flashlight is concealed in the telescope. In the exposed position, the flashlight is exposed from the telescope. The flashlight can be operated in both of the concealed and exposed positions.

17 Claims, 9 Drawing Sheets

TELESCOPIC AND ILLUMINATIVE DEVICE

BACKGROUND OF INVENTION

1. Field of Invention

The present invention relates to a telescopic and illuminative device.

2. Related Prior Art

While hiking or mountain biking, people often bring telescopes or binoculars with them in order to enjoy watching beautiful scenes of mountains or seas while the sun is setting. As a lamppost is nowhere to find in the wild, it is dark after the sunset. It is dangerous for people to walk in the dark since they cannot see things clearly. Flashlights could help in these situations. Carrying a telescope or a binocular plus a flashlight, however, results in a heavy load and inconvenience for a person.

On other occasions such as shows or concerts, indoor or outdoor, it is difficult and takes a lot of time to find seats in dark or dim environments. In the seats, the audience that is far from the stages needs telescopes or binoculars in order to see the performers clearly. Again, it is heavy, bulky and inconvenient for a person to bring a telescope or binocular and a flashlight.

The present invention is therefore intended to obviate or at least alleviate the problems encountered in the prior art.

SUMMARY OF INVENTION

According to the present invention, a telescopic and illuminative device is disclosed. The telescopic and illuminative device includes a telescope and a flashlight. The flashlight can be switched between a concealed position and an exposed position. In the concealed position, the flashlight is concealed in the telescope. In the exposed position, the flashlight is exposed from the telescope. The flashlight can be operated in both of the concealed and exposed positions.

An advantage of the telescopic and illuminative device of the present invention is to provide two functions in a compact design.

Another advantage of the illuminative and telescopic device of the present invention is that it is light in weight.

Other advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
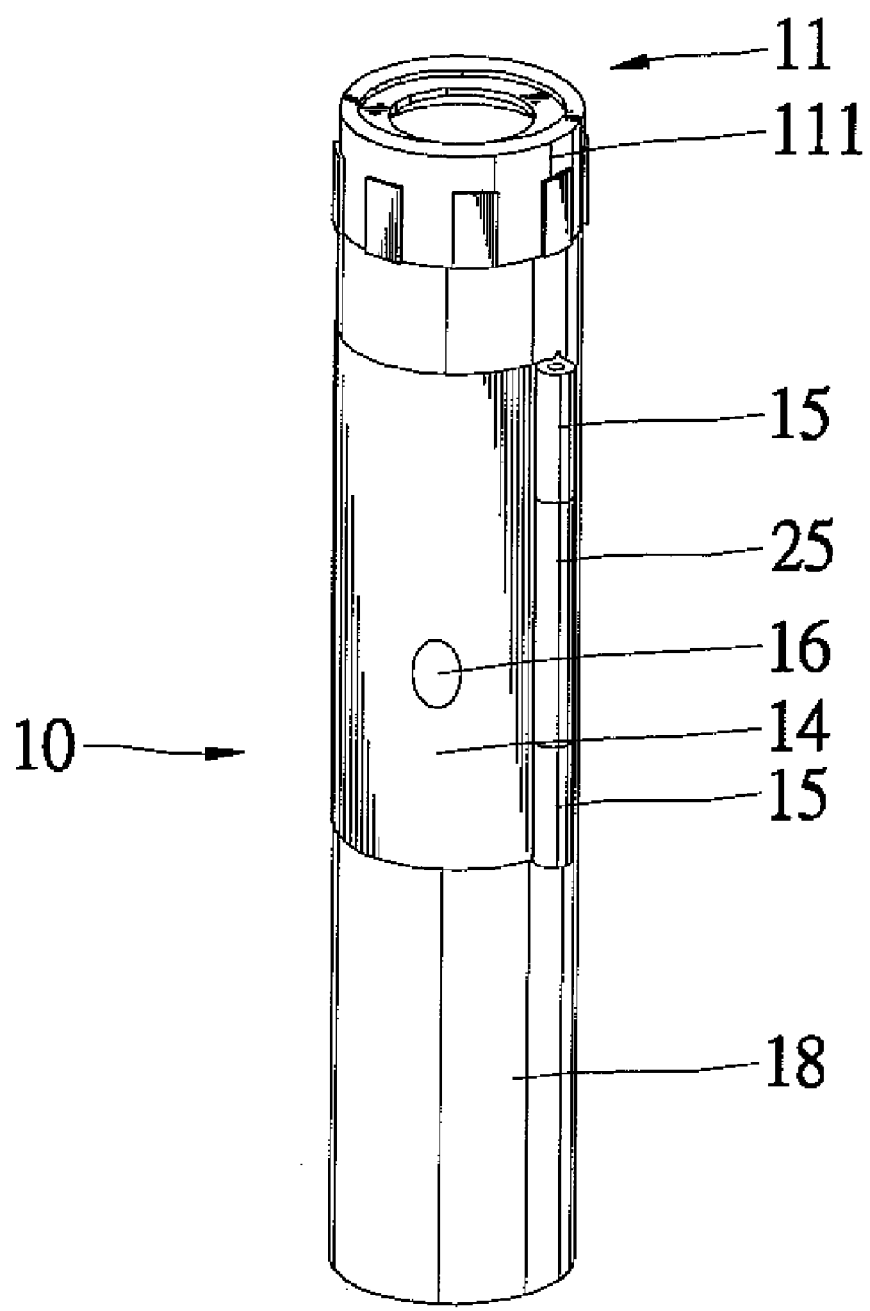
FIG. 1 is a perspective view of a telescopic and illuminative device according to a first embodiment of the present invention.
Figure 2:
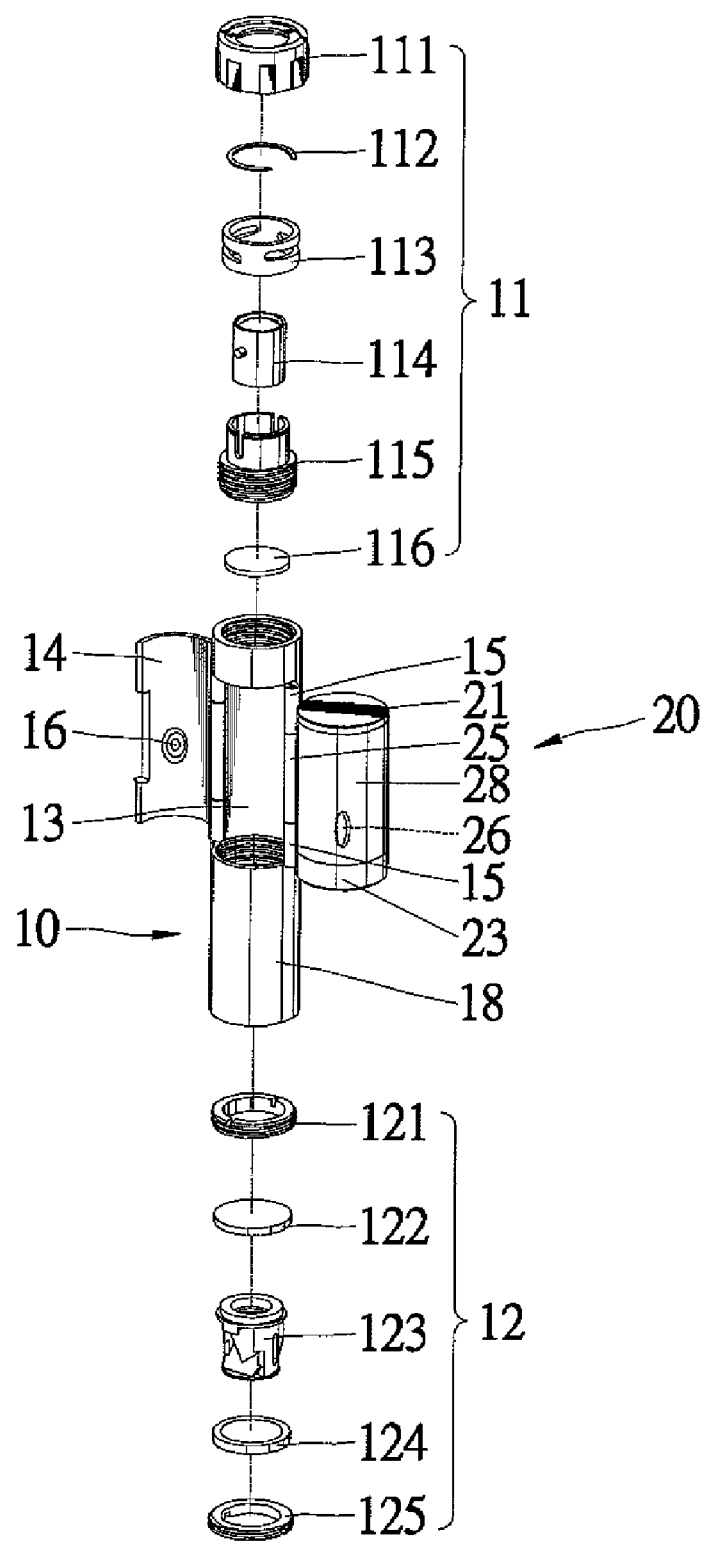
FIG. 2 is an exploded view of the telescopic and illuminative device shown in FIG. 1.
Figure 3:
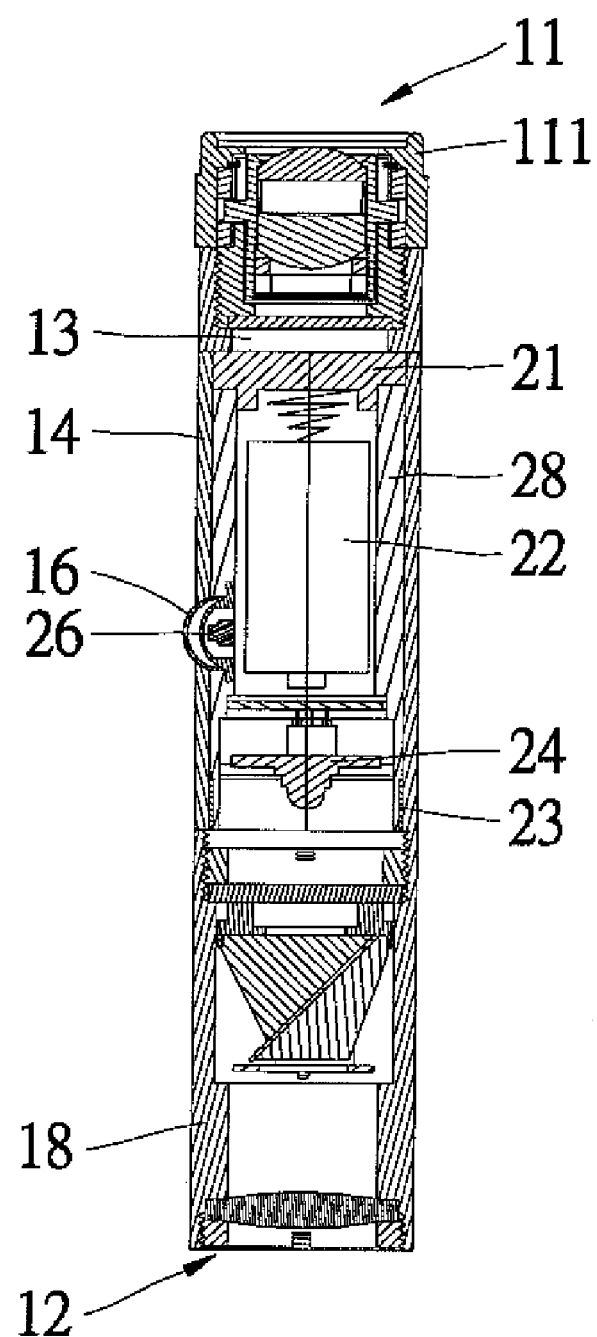
FIG. 3 is a cross-sectional view of the telescopic and illuminative device shown in FIG. 1.

Referring to FIGS. 1 through 3, a telescopic and illuminative device includes a telescope 10 and a flashlight 20. The telescope 10 includes a cylinder 18, an eyepiece unit 11 installed at an end of the cylinder 18 and an object lens unit 12 installed at an opposite end of the cylinder 18.

The cylinder 18 includes a space 13 defined therein for receiving the flashlight 20, a rigid cover 14 pivotally installed thereon for covering the space 13, an elastic cover 16 installed on the rigid cover 14 and two sleeves 15 formed thereon.

The eyepiece unit 11 includes a first rotary ring 111, a C-ring 112, a second rotary ring 113, an eyepiece 114, an eyepiece seat 115 and a transparent partition 116. The object lens unit 12 includes a partition seat 121, a transparent partition 122, a reflector 123, an object lens 124 and a lens seat 125. The eyepiece unit 11 and the object lens unit 12 are both conventional and therefore will not be described in detail.

The flashlight 20 includes a cylinder 28, a lens 23, a light source 24, a button 26 and a cover 21. The cylinder 28 includes a sleeve 25 formed thereon. A pin (not numbered) is fit in the sleeves 15 and 25 in order to pivotally install the cylinder 28 on the cylinder 18. The lens 23 is installed at an end of the cylinder 28. The light source 24 is installed in the cylinder 28 near the lens 23. The battery 22 is put in the cylinder 28 for powering the light source 24. The button 26 is installed on the cylinder 28 corresponding to the elastic cover 16. Thus, a user can turn on and off the flashlight 20 by pressing the button 26 indirectly through the elastic cover 16. The cover 21 is attached, in a detachable manner, to an opposite end of the cylinder 28 for keeping the battery 22 in the cylinder 28.

Figure 4:
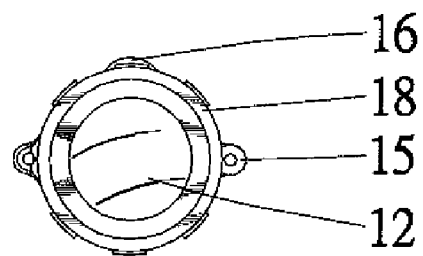
FIG. 4 is a side view of the telescopic and illuminative device shown in FIG. 1.
Figure 5:
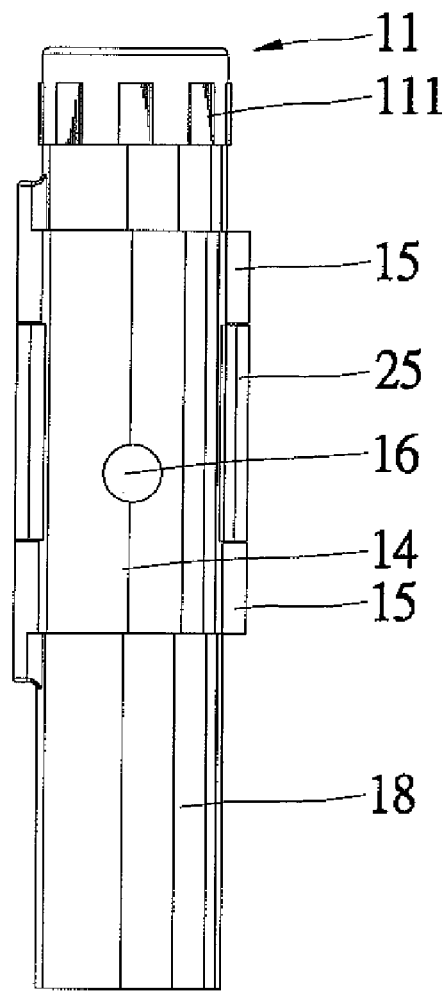
FIG. 5 is a side view of the telescopic and illuminative device shown in FIG. 4.

Referring to FIGS. 3 through 5, the flashlight 20 is in a concealed position. That is, the flashlight 20 is put in the space 13 defined in the cylinder 18 of the telescope 10. The entire telescopic and illuminative device occupies a small space, and can be carried conveniently. A user can turn on and off the flashlight 20 by pressing the button 26 indirectly through the elastic cover 16. The light source 24 can cast light through the object lens unit 12.

Figure 6:
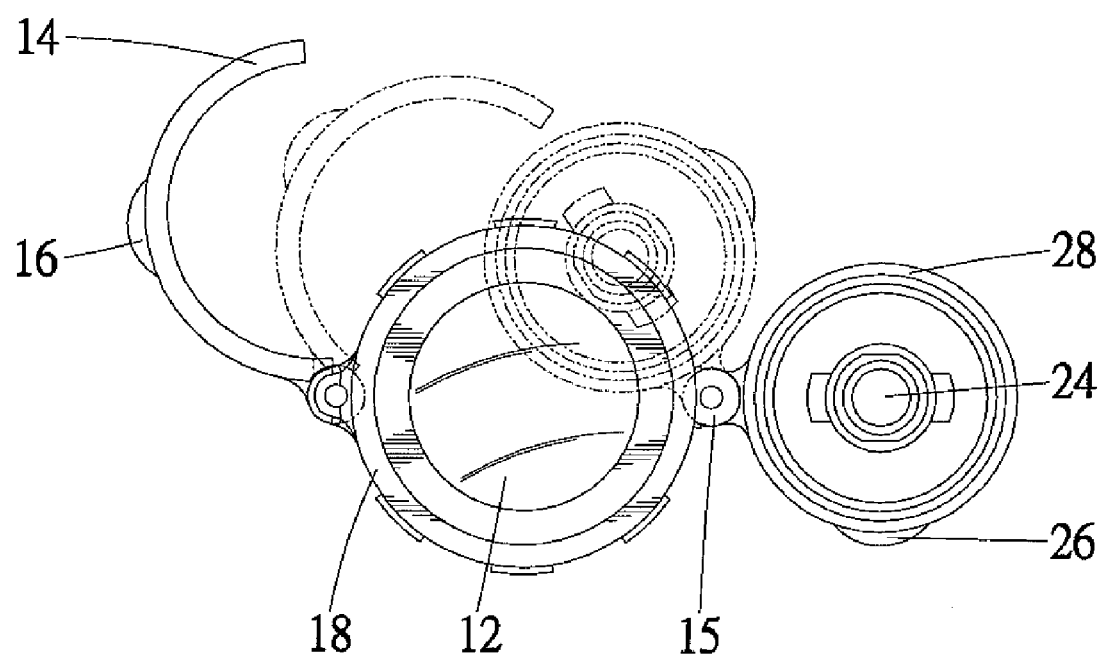
FIG. 6 is a top view of the telescopic and illuminative device shown in FIG. 1 showing how the flashlight is taken from the telescope.
Figure 7:
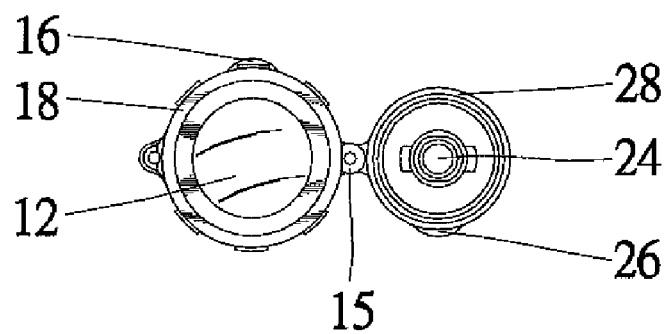
FIG. 7 is a top view of the telescopic and illuminative device shown in FIG. 1 showing the telescope and the flashlight ready for use.
Figure 8:
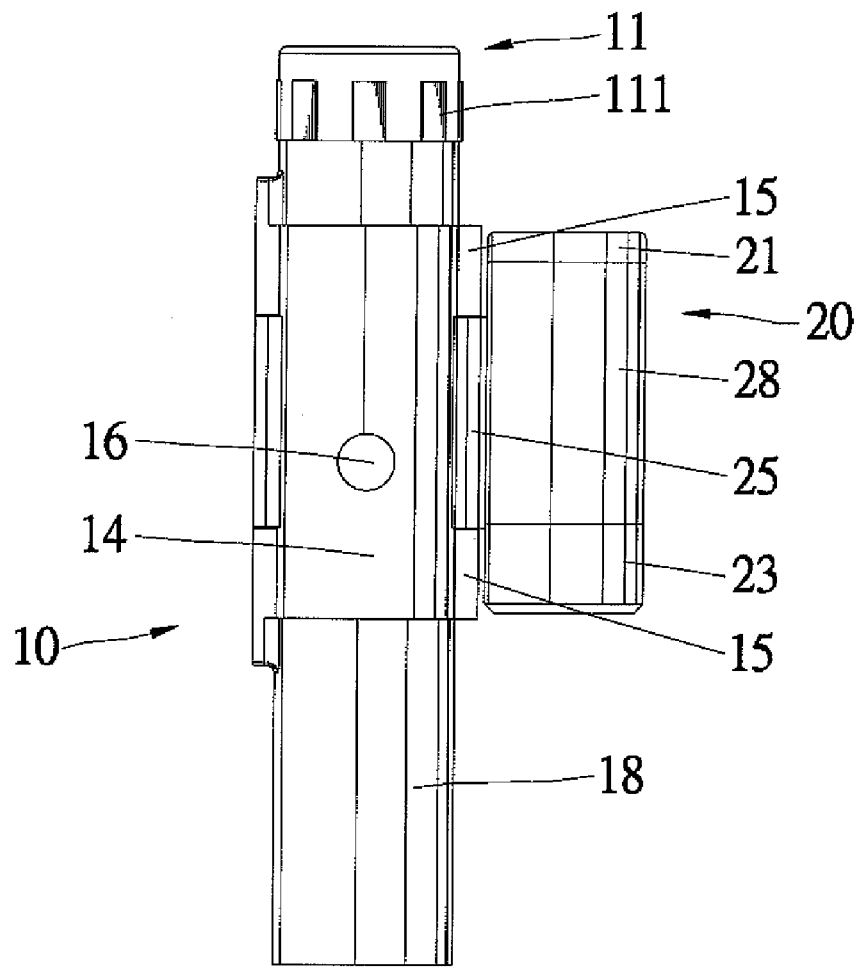
FIG. 8 is a side view of the telescopic and illuminative device shown in FIG. 7.
Figure 9:
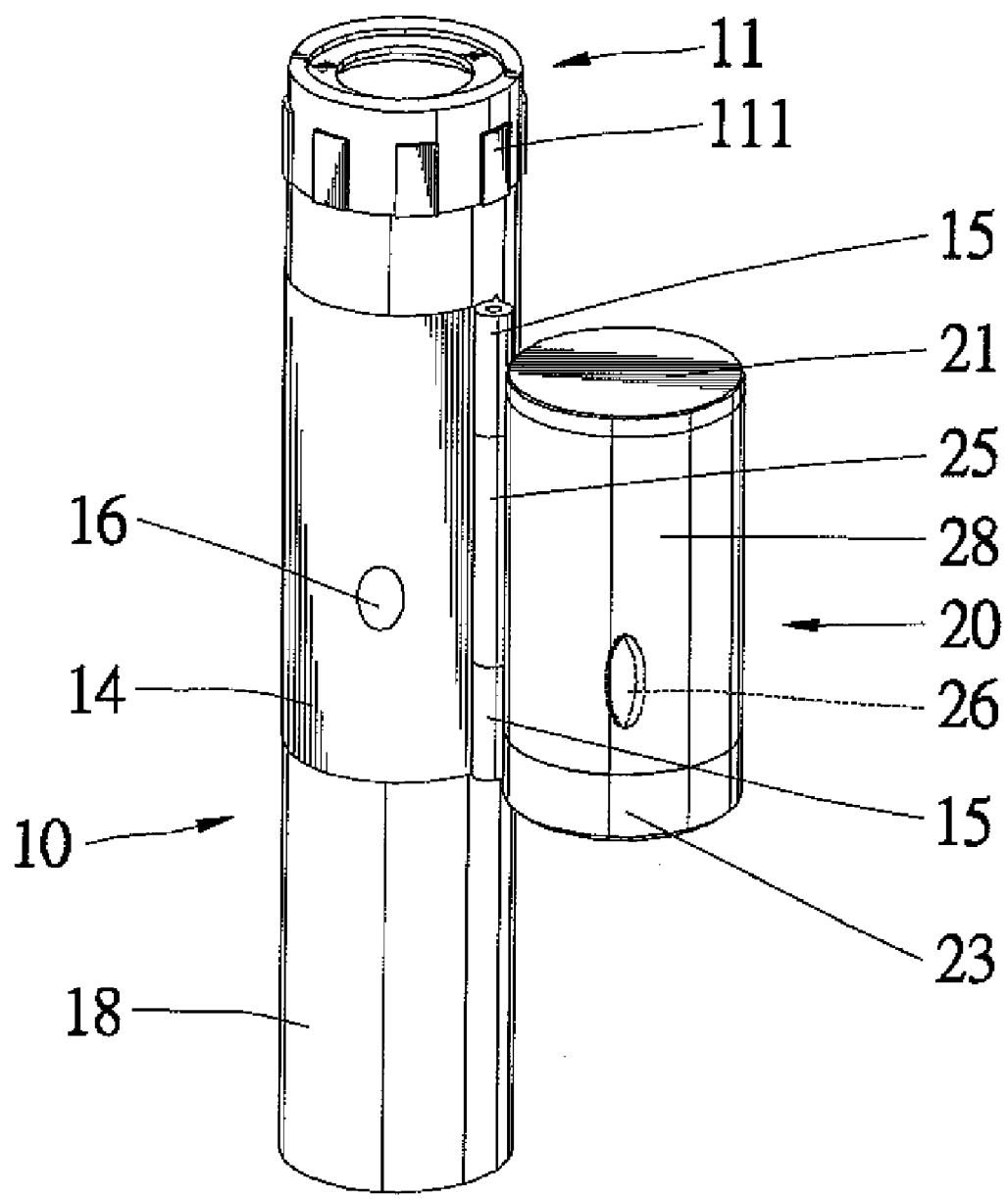
FIG. 9 is a perspective view of the telescopic and illuminative device shown in FIG. 8.

FIG. 6 shows how the flashlight 20 can be switched to an exposed position shown in FIGS. 7 through 9 from the concealed position shown in FIGS. 3 through 5. To this end, the cover 14 is opened. Then, the flashlight 20 is moved from the space 13 defined in the cylinder 18. Finally, the cover is closed again.

Referring to FIGS. 7 through 9, the flashlight 20 is in the exposed position. The telescope 10 is in a working position since the eyepiece unit 11 is no longer blocked from the object lens unit 12 by the flashlight 20. The first rotary ring 111 can be rotated in order to adjust the focal length of the telescope 10. A user can turn the flashlight 20 on and off by pressing the button 26 directly.

Figure 10:
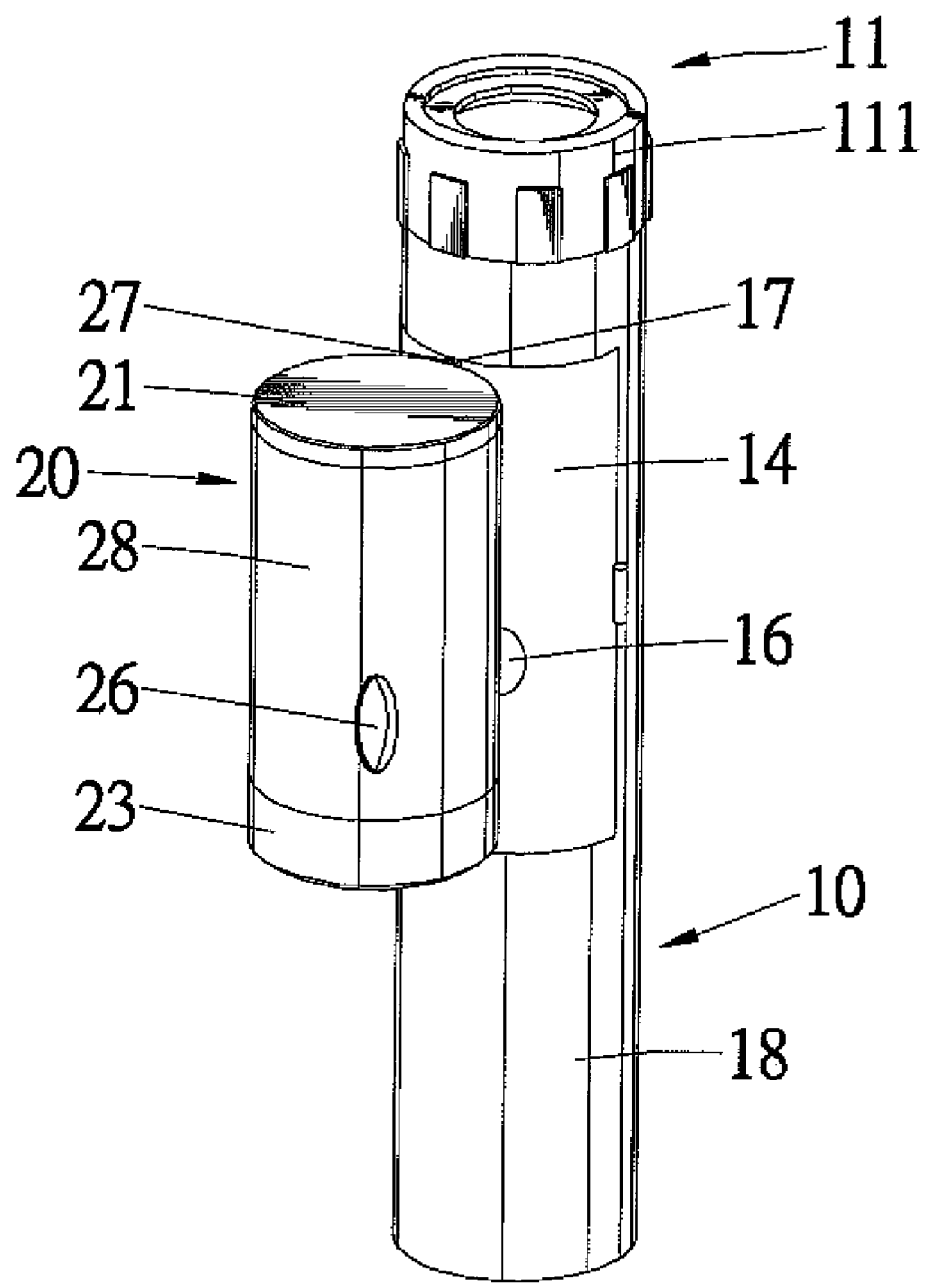
FIG. 10 is a perspective view of a telescopic and illuminative device according to a second embodiment of the present invention.

FIG. 10 shows a telescopic and illuminative device according to a second embodiment of the present invention. The second embodiment is identical to the first embodiment except that the cylinder 28 is not pivotally connected with the cylinder 18. That is, the sleeves 15 and 25 and the pin are saved. The flashlight 20 is simply put in the space 13 defined in the cylinder 18 of the telescope 10. The flashlight 20 can be moved from the space 13 defined in the cylinder 18 of the telescope 10 and then attached to the cover 14 in a detachable manner. To this end, the cover 14 defines a groove 17, and the cylinder 28 includes a ridge 27 formed thereon for sliding into the groove 17.

Figure 11:
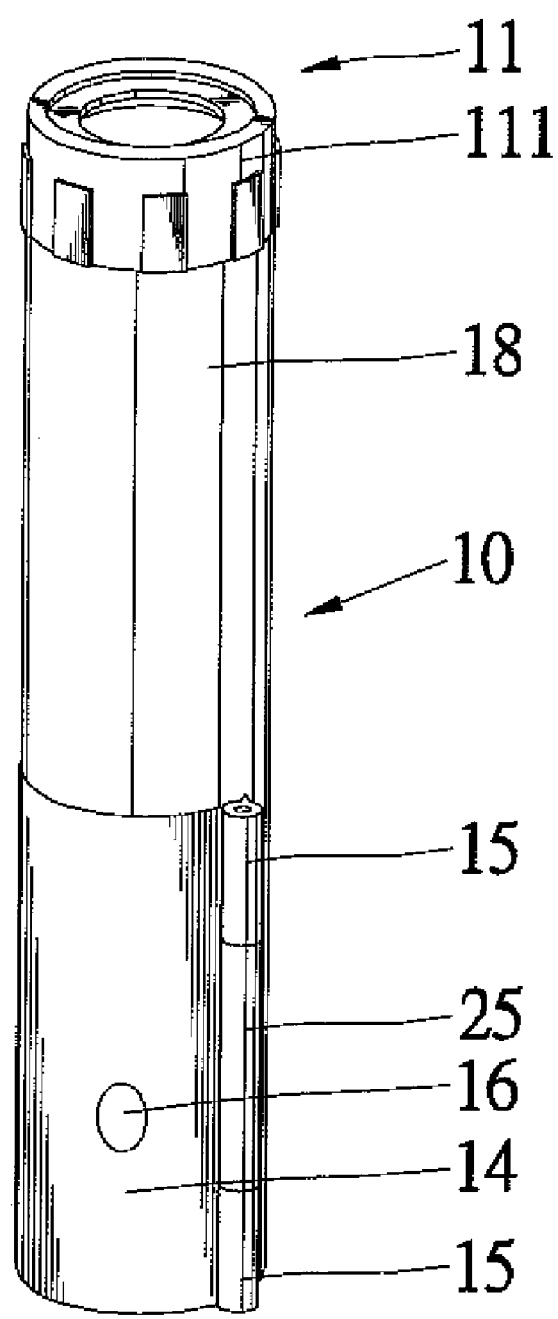
FIG. 11 is a perspective view of a telescopic and illuminative device according to a third embodiment of the present invention.

FIG. 11 is a perspective view of a telescopic and illuminative device according to a third embodiment of the present invention. The third embodiment is similar to the first embodiment except that the flashlight 20 is located beyond the eyepiece unit 11 and the object lens unit 12 instead of between the eyepiece unit 11 and the object lens unit 12. Thus, the light source 24 does not cast light through the object lens 124.

The telescopic and illuminative device of the present invention includes several advantageous features. Firstly, it provides two functions in a compact design. It provides only the illuminative function in a mode, and provides both of the illuminative and telescopic functions simultaneously in another mode. Secondly, it is light in weight.

The present invention has been described through the detailed description of the embodiments. Those skilled in the art can derive variations from the embodiments without departing from the scope of the present invention. Therefore, the embodiments shall not limit the scope of the present invention defined in the claims.

What is claimed is:

1. A telescopic and illuminative device comprising:
   a telescope comprising a cylinder; and
   a flashlight, with the flashlight pivotally installed on the cylinder of the telescope about a flashlight pivot axis;
   wherein the flashlight is pivotable between a concealed position and an exposed position, with the flashlight concealed in the cylinder of the telescope in the concealed position, and with the flashlight exposed from the cylinder of the telescope in the exposed position wherein the telescopic and illuminative device in the concealed position provides only the illuminative function in a mode and the exposed position provides both of the illuminative and telescopic functions simultaneously in another mode.

2. The telescopic and illuminative device according to claim 1, wherein the telescope comprises a rigid cover pivotally connected with the cylinder of the telescope about a cover pivot axis parallel to and spaced from the flashlight pivot axis, with the rigid cover covering the flashlight in the concealed position.

3. The telescopic and illuminative device according to claim 1, comprising a hinge for pivotally connecting the flashlight with the cylinder of the telescope.

4. The telescopic and illuminative device according to claim 1, wherein the cylinder of the telescope defines a groove, wherein the flashlight comprises a ridge formed thereon for sliding into the groove, with the flashlight attached to the cylinder of the telescope in a detachable manner in the exposed position of the flashlight.

5. The telescopic and illuminative device according to claim 1, wherein the flashlight comprises a cover, with the cover retaining at least one battery in the flashlight.

6. The telescopic and illuminative device according to claim 1, wherein the flashlight casts light in the concealed position and the exposed position, wherein the telescope further comprises an elastic cover provided on the cylinder of the telescope, wherein the flashlight comprises a button, with the button adjacent the elastic cover when the flashlight is in the concealed position, and with the button reversibly actuated through the elastic cover in the concealed position of the flashlight.

7. The telescopic and illuminative device according to claim 6, wherein the telescope comprises a rigid cover pivotally connected with the cylinder of the telescope about a cover pivot axis parallel to and spaced from the flashlight pivot axis, with the rigid cover covering the flashlight in the concealed position, wherein the elastic cover is provided on the rigid cover.

8. The telescopic and illuminative device according to claim 1, wherein the cylinder of the telescope has a first end and a second end, wherein the telescope further comprises an eyepiece unit installed in the first end of the cylinder of the telescope, and an object lens unit installed in the second end of the cylinder of the telescope.

9. The telescopic and illuminative device according to claim 8, wherein the flashlight is located between the eyepiece unit and the object lens unit in the concealed and exposed positions.

10. The telescopic and illuminative device according to claim 9, wherein the flashlight casts light through the object lens unit in the concealed position.

11. The telescopic and illuminative device according to claim 1, wherein the flashlight comprises a light source installed in the flashlight.

12. The telescopic and illuminative device according to claim 11, wherein the flashlight comprises a lens attached to the flashlight for covering the light source.

13. A telescopic and illuminative device comprising:
    a telescope comprising a cylinder having an axis; and
    a flashlight casting light along an axis, with the flashlight movably installed on the cylinder of the telescope between a concealed position and an exposed position, with the flashlight concealed in the cylinder of the telescope with the axis of the cylinder parallel to the axis of the light in the concealed position, and with the flashlight outside the cylinder of the telescope with the axis of the light parallel to but spaced from the axis of the cylinder in the exposed position wherein the telescopic and illuminative device in the concealed position provides only the illuminative function in a mode and the exposed position provides both of the illuminative and telescopic functions simultaneously in another mode.

14. The telescopic and illuminative device according to claim 13, wherein the cylinder of the telescope has a first end and a second end, wherein the telescope further comprises an eyepiece unit installed in the first end of the cylinder of the telescope, and an object lens unit installed in the second end of the cylinder of the telescope.

15. The telescopic and illuminative device according to claim 14, wherein the flashlight is located between the eyepiece unit and the object lens unit in the concealed and exposed positions.

16. The telescopic and illuminative device according to claim 15, wherein the flashlight casts light through the object lens unit in the concealed position.

17. The telescopic and illuminative device according to claim 16, wherein the flashlight comprises a cover retaining at least one battery in the flashlight with the cover intermediate the eyepiece unit and the battery, a light source installed in the flashlight with the battery intermediate the cover and the light source and a lens attached to the flashlight for covering the light source with the light source intermediate the lens and the battery and the lens intermediate the light source and the object lens unit, with the eyepiece unit aligned sequentially along the axis of the light with the cover, the light source, the lens and the object lens in the concealed position.

* * * * *